Sept. 29, 1964
E. C. TROMM
3,150,722
CULTIVATING TOOL
Filed July 22, 1963
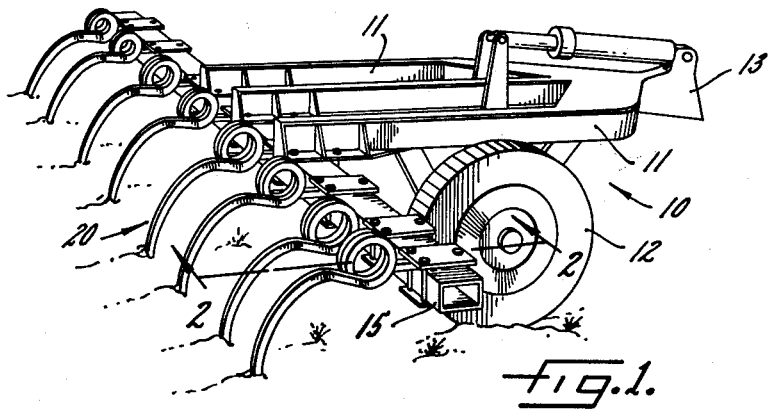
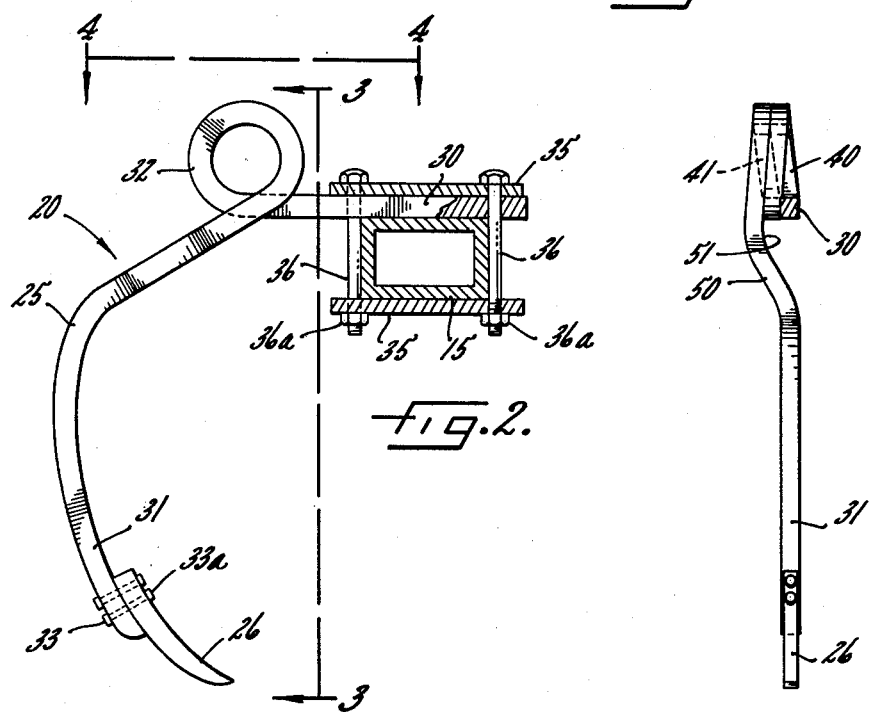
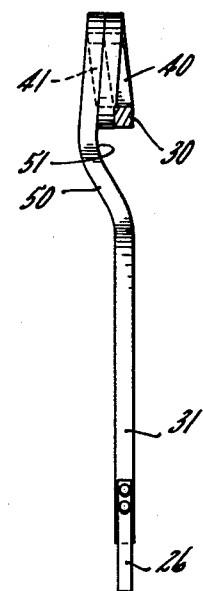
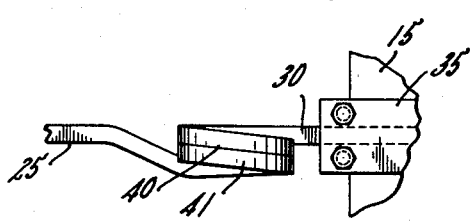
INVENTOR.
Elmer C. Tromm,
BY
Byron, Hume, Groen & Clement
ATTORNEYS.

3,150,722
CULTIVATING TOOL
Elmer Chester Tromm, East Alton, Ill., assignor to Unit
 Rail Anchor Corporation, Pittsburgh, Pa., a corporation
 of New Jersey
Filed July 22, 1963, Ser. No. 296,705
5 Claims. (Cl. 172—707)

This invention relates in general to earth working devices and, more particularly, to a cultivator tool construction.

It has long been conventional practice to use cultivator tools incorporating shanks having spring coil arrangements therein to provide resiliency should the working portion of the tool encounter obstructions. Such cultivator shank constructions ordinarily set the working portion or shear off to one side of the mounting end of the shank, of course, introducing a certain amount of side thrust to the cultivator as it operates. To compensate for this sidethrust, the tools are ordinarily constructed and arranged to develop opposite and balancing side thrusts on the cultivator.

Various developments, including the double offset shank construction illustrated in the Hill Patent No. 2,761,267, for example, have been proposed as successful expedients for eliminating the necessity of utilizing oppositely constructed and arranged cultivator tools. Each, including the double offset construction, suffers congenital defects, however. In the construction illustrated in the aforementioned Hill patent, for example, considerable residual stresses are introduced into the tool shank by the double offset forming process. These stresses frequently result in breakage of the shank during operation. Furthermore, maximum stresses are developed between the spring coils and the tool bar and the offset defined there is frequently a point of fatigue failure.

Furthermore, with double offset shank constructions twisting of the shank adjacent the tool bar is encouraged by the relatively substantial longitudinal canting of the coils necessitated by the double offset construction. Such twisting frequently results in a substantial permanent distortion of the shank when it is subjected to relatively heavy stresses, as when encountering an obstruction, for example.

Accordingly, it is an object of the present invention to provide an improved cultivator tool construction.

It is another object to provide a cultivator tool construction which substantially eliminates side thrust in the cultivator.

It is still another object to provide a cultivator tool construction which effectively assures inline draft along the tool shank.

It is still another object to provide a cultivator tool construction wherein twisting of the coil and off line stresses are virtually eliminated.

It is a further object to provide an offset cultivator tool construction which assures minimum permanent tool shank distortion during operation.

It is yet a further object to provide an offset cultivator shank which is relatively simple and inexpensive in construction.

The foregoing objects and others are realized in accordance with the present invention by providing a vastly improved cultivator tool shank construction. Briefly, the invention contemplates providing a cultivator shank construction which assures the establishment of inline draft from the attaching portion of the shank, through the working portion thereof, while substantially obviating twisting stresses and eliminating other inherent weaknesses of the double offset shank construction. The inline shank construction of the present invention incorporates a single offset, and that in the working portion of the shank adjacent the spring coil. The single offset defines a relatively large radius curve which readily absorbs substantial stresses developed in the shank during cultivator operations. A short, straight attaching portion facilitates attachment of the shank to the tool bar at a point close to the coil for maximum support of the shank by the bar.

The invention, both as to its organization and the method of operation, taken with further objects and advantages thereof, will best be understood by reference to the following description taken in connection with the accompanying drawings, in which:

FIGURE 1 is a perspective view of a cultivator incorporating spring cultivator tools embodying features of the present invention;

FIGURE 2 is an enlarged sectional view taken along line 2—2 of FIGURE 1, with parts broken away;

FIGURE 3 is an enlarged sectional view taken along line 3—3 of FIGURE 2; and

FIGURE 4 is an enlarged view, with parts broken away, taken along line 4—4 of FIGURE 2.

Referring now to the drawings, and particularly to FIGURE 1, a broadly conventional cultivator is illustrated generally at 10. The cultivator 10 includes a framework 11 supported for travel on wheels 12 and adapted to be connected to a tractor (not shown) through a conventional connector arrangement 13. A transversely extending tool bar 15 secured to the rearmost portion of the framework 11 carries a plurality of cultivator tools 20 embodying features of the present invention.

Each of the cultivator tools 20 is substantially identical in construction. Accordingly, only one tool 20 is shown and described in detail. The corresponding components of the other cultivator tools 20 are identified by corresponding reference numerals.

Turning to FIGURES 2–4, each cultivator tool 20 includes a shank 25 and a working shear 26. The shank 25, in turn, includes a mounting portion 30 secured to the tool bar 15, a working portion 31 upon which the working shear 26 is conventionally mounted with machine bolts 33A and nuts 33, and a coil portion 32 interconnecting the mounting portion 30 and the working portion 31. The shank 25 is preferably formed of spring steel or the like.

The mounting portion 30 of the shank 25 is clamped on the tool bar 15 by means of metal plates 35 bracketing the tool bar and urged together by conventional machine bolts 36 and nuts 36a. As best seen in FIGURE 4, the mounting portion 30 of the shank 25 extends straight rearwardly of the tool bar 15 to where the coil portion 32 is formed laterally of the mounting portion. This straight configuration of the mounting portion 30 is a feature of the present invention and permits the cultivator tool 20 to be secured to the tool bar 15 immediately adjacent the coil portion 32. Accordingly, maximum support of the coil portion 32 and consequently the working portion 31 of the tool 20 is provided during operation of the cultivator 10.

The coil portion 32 of the shank 25 is incorporated to provide resiliency, of course. The coil portion 32 includes a series of coils 40 and 41. The number of coils 40–41 utilized is somewhat arbitrary but it has been found in practice that two coils provide optimum results.

As best seen in FIGURE 4, the plane of each of the coils 40–41 is normally canted slightly to the longitudinal axis of the mounting portion 30 of the shank 25. This slight cant is preferably in the neighborhood of about 4° and is just sufficient to compensate for the slight lateral force exerted on the coils 40–41 by the draft on the tool 20. During operation then, the draft draws the coils 40–41 into planes substantially parallel to the longitudinal axis of the mounting portion 30 of the shank 25 and the entire tool is "inline" with the direction of cultivator 10 travel. Accordingly, lateral and twisting stresses on the shank 25 and the coil 32 during cultivator operation are substantially avoided.

Referring to FIGURES 3 and 4, the working portion 31 of the shank 25 is offset inwardly of the outermost coil 41 and into inline relationship with the mounting portion 30 of the shank. The offset 50 is formed immediately adjacent the coil portion 32 of the shank 25 and includes a substantially large radius, gradual curve 51 in the working portion 31 of the shank. The gradualness of the curve 51 may be measured for purposes of comparison by relating it to the inside diameter of the coils 40 and 41. In this light it will be seen that the length of the curve 51 is greater than such inside diameter. The gradualness of this curve 51 defining the offset 50 in the working portion 31 effectively avoids development of substantial residual stresses in the offset 50 during the forming of the shank 25 and accordingly tends to prevent distortion of the shank 25 during cultivator operation.

In addition, as a further beneficial consequence of this large radius curve construction, the shank 25 in this area is permitted to flex over a substantially great distance. Thus, in field operation a lower stress level is reached in the offset 50 and breakage normally encountered at this critical point is virtually eliminated.

The single offset shank 25 of the cultivator tool 20 embodying features of the present invention permits the coil portion 32 to be mounted in closer proximity to the tool bar 15, as has been pointed out. This provides for more rigid control of the shank 25 and eliminates excess leverage space between the tool bar 15 and the coils 40–41. The use of a short, straight mounting portion 30 assures that it is readily able to withstand the normally high stresses developed in the shank 25 adjacent the tool bar 15 (unlike the cultivator shank construction disclosed in the aforementioned Hill patent, for example, wherein a relatively sharp radii bend is necessarily incorporated in the mounting portion). This area between the coils 40–41 and the tool bar 15 is critical, of course, since it is normally subjected to the greatest stresses.

With the present structure, the coils 40–41 are canted (with respect to the longitudinal axis of the tool 20) to a substantially lesser degree than encountered in the double offset construction, for example. In this light, the coils of the tool 20 of the present invention are canted only about 4° to this axis and are pulled directly into parallel relationship with all the working surfaces of the tool during operation thereof, as has been pointed out. In contrast, in the construction illustrated in the aforementioned Hill patent, for example, the double offset shank requires that coils be canted approximately 8° to the longitudinal axis of the tool to assure that they are drawn no further than into parallel relationship with these working surfaces during operation. As a result of this relatively large angular relationship, a substantial amount of twisting of the coils is effected as the coils are drawn into parallel relationship during cultivator operation and such twisting is detrimental to the service life of the tool, of course.

The single offset construction of the present invention further results in minimum permanent distortion of the shank 25 under working pressures. In tests, for example, it has been found that the single offset construction assures that the shank 25 is permanently distorted only approximately one-half as much as a double offset shank construction, while being subjected to substantially twice as much draft.

While an embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A cultivator tool for attachment to tool mounting means comprising; shank means having working means on one end thereof, said shank means including a substantially straight mounting portion adapted to be secured to said tool mounting means, a coil portion including at least one coil, the trailing end of said substantially straight mounting portion forming the leading end of said coil, said coil extending laterally from one side of said attaching portion, and a working portion extending from said coil portion, said working portion including a curved section defining an offset in said shank which brings the bulk of said working portion substantially into longitudinal alignment with said mounting portion.

2. The cultivating tool of claim 1 further characterized in that said coil portion includes a plurality of coils, each of said coils normally lying in a vertical plane inclined on a vertical axis at an angle in the neighborhood of about 4° from a vertical plane passing through the longitudinal axis of said mounting portion, draft imparted to said working portion during operation of said tool tending to draw said coils into parallel planar relationship with the longitudinal axis of said tool.

3. A cultivator tool for attachment to tool mounting means comprising; shank means having working means on one end thereof, said shank means including a short, substantially straight mounting portion adapted to be secured to said tool mounting means, a plurality of coils, the trailing end of said substantially straight mounting portion forming the leading end of one of said coils, the other coils connected to and extending laterally from one side of said one coil, and a working portion extending from the outermost of said other coils, said working portion including a curved section defining an offset which brings the bulk of said working portion substantially into longitudinal alignment with said mounting portion.

4. The cultivator of claim 1 further characterized in that said coil has a predetermined inside diameter, said curved portion having a length at least as great as said inside diameter of said coil.

5. A cultivating assembly comprising a cultivator tool and a tool bar, said tool extending transversely of said tool bar and including a substantially straight mounting portion secured to said tool bar, a coil portion including at least one coil formed in said shank means adjacent said tool bar, the trailing end of said substantially straight mounting portion forming the leading end of said coil, said coil portion extending laterally from one side of said attaching portion, and a working portion extending from said coil portion, said working portion including a curved section defining an offset in said shank which brings the bulk of said working portion substantially into longitudinal alignment with said mounting portion.

References Cited in the file of this patent
UNITED STATES PATENTS
2,761,267     Hill                 Sept. 4, 1956